United States Patent
Edpalm

(10) Patent No.: US 10,075,727 B2
(45) Date of Patent: Sep. 11, 2018

(54) METHOD AND SYSTEM FOR ENCODING A VIDEO STREAM

(71) Applicant: Axis AB, Lund (SE)

(72) Inventor: Viktor Edpalm, Lund (SE)

(73) Assignee: Axis AB, Lund (SE)

( * ) Notice: Subject to any disclaimer, the term of this patent is extended or adjusted under 35 U.S.C. 154(b) by 38 days.

(21) Appl. No.: 15/459,646

(22) Filed: Mar. 15, 2017

(65) Prior Publication Data

US 2017/0272771 A1    Sep. 21, 2017

(30) Foreign Application Priority Data

Mar. 15, 2016    (EP) ..................... 16160285

(51) Int. Cl.
| | | |
|---|---|---|
| *H04N 19/513* | (2014.01) | |
| *H04N 19/172* | (2014.01) | |
| *H04N 19/176* | (2014.01) | |
| *H04N 19/182* | (2014.01) | |
| *H04N 19/107* | (2014.01) | |
| *H04N 19/109* | (2014.01) | |
| *H04N 19/17* | (2014.01) | |
| *H04N 19/583* | (2014.01) | |

(52) U.S. Cl.
CPC ......... *H04N 19/513* (2014.11); *H04N 19/107* (2014.11); *H04N 19/109* (2014.11); *H04N 19/17* (2014.11); *H04N 19/172* (2014.11); *H04N 19/176* (2014.11); *H04N 19/182* (2014.11); *H04N 19/583* (2014.11)

(58) Field of Classification Search
CPC combination set(s) only.
See application file for complete search history.

(56) References Cited

U.S. PATENT DOCUMENTS

| | | | |
|---|---|---|---|
| 5,619,281 A * | 4/1997 | Jung | ............. H04N 19/56 348/699 |
| 7,929,609 B2 | 4/2011 | Riemens et al. | |
| 8,102,915 B2 | 1/2012 | Klein Gunnewiek et al. | |
| 8,774,272 B1 | 7/2014 | Chen | |
| 2010/0079605 A1 | 4/2010 | Wang et al. | |
| 2010/0118185 A1 | 5/2010 | Furukawa et al. | |
| 2011/0292997 A1 | 12/2011 | An et al. | |
| 2013/0329799 A1 | 12/2013 | Lin et al. | |

FOREIGN PATENT DOCUMENTS

| | | |
|---|---|---|
| CN | 1554194 A | 12/2004 |
| CN | 1875633 A | 12/2006 |
| CN | 103673990 A | 3/2014 |
| EP | 0 572 904 A2 | 12/1993 |
| WO | 199530310 A1 | 11/1995 |
| WO | 2009156965 A1 | 12/2009 |

OTHER PUBLICATIONS

EP 16 16 0285.9 European Search Report (dated Aug. 5, 2016).
Chinese Office Action dated Apr. 4, 2018 for the Chinese Patent Application No. 201710141219.7.

* cited by examiner

*Primary Examiner* — Nam D Pham
(74) *Attorney, Agent, or Firm* — Volpe and Koenig, P.C.

(57) ABSTRACT

A method is performed in an encoder for encoding a video stream captured by a camera, and a computer program product and encoder implementing the method.

14 Claims, 5 Drawing Sheets

METHOD AND SYSTEM FOR ENCODING A VIDEO STREAM

FIELD OF INVENTION

The present invention relates generally to a method performed in an encoder for encoding a video stream captured by a camera, and to a computer program product and encoder implementing the method.

BACKGROUND

For many video camera applications, e.g. monitoring applications, it is advantageous to use a camera which can pan, tilt (and optionally zoom and/or rotate) to cover a large area. Such a camera is known under the name PT (pan-tilt) camera, PTZ (pan-tilt-zoom) camera etc. During e.g. a pan/tilt motion of the camera, the bit rate of a video stream captured by the camera can reach high levels since most or all pixel blocks within an image frame are encoded using costly I-blocks during such motion, leading to an increased bit rate. Alternatively, the encoding quality of the video stream is reduced during such motion of the camera to decrease the bit rate. However, this may result in a generally blurred out video stream.

Within image processing there is a continuing effort put into reducing bit rate or image size while maintaining a perceived quality of an image. A solution to the above problem is to adapt a motion vector search range of the encoder encoding the video stream according to the speed of the pan/tilt adjustment. Since searching for matching blocks of pixels between two images usually requires a large amount of arithmetic computation and an increased motion vector search range lead to that more comparisons is made, a problem with this solution is that the computational complexity of the encoding process will increase, thus requiring more processor power and/or increased processing time for completing the encoding process.

There is thus a need for improvements within this context.

SUMMARY

In view of the above, an objective of the invention is to solve or at least reduce one or several of the drawbacks discussed above. Generally, the above objective is achieved by the attached independent patent claims.

According to a first aspect, the present invention is realized by a method performed in an encoder for encoding a video stream captured by a camera, the video stream comprising a first image frame and a second image frame, the first image frame being previous to the second image frame in the video stream. The method comprises the steps of:
  receiving information regarding a movement of the camera,
  defining, based on the information regarding a movement of the camera, a first area of the second image frame comprising image data present also in the first image frame, and a second area of the second image frame comprising image data not present in the first image frame,
  for the second area, encoding each block of pixels using I-block encoding,
  for each specific block of pixels of the first area, selecting between encoding the specific block of pixels as one of: I-block, P-block and P skip block based on an output from a block matching algorithm using the specific block of pixels and at least parts of the first image frame as input to the block matching algorithm, and encoding the specific block of pixels according to the selection.

The inventor has realized that since the first and second image frame covers at least partly different parts of the surrounding environment, and since this can be defined using the movement information of the camera, and improved encoding of the second image can be achieved. The motion of the camera can be accessible by the encoder e.g. data sent from the camera to the encoder regarding input to a PT(Z) control of the camera, information on a step motor movement of the camera, motion sensor data (from a gyro etc.) from the camera, global motion estimation from temporal filtering of image frames in the video stream etc.

Using this information, a first and second area in the second image frame can be defined, where the second area is known to be a new area, i.e. cover a new part of the surrounding environment, compared to what is captured in the first image frame. Consequently, the second area is much more likely to comprise image data not present in the first image frame. The first area is on the other hand covering an area of the surroundings that also was covered in the first image. Consequently, the first area is much more likely to comprise image data being present in the first image frame. When these areas have been determined in the second image, each block of pixels in the second area can be encoded using I-block encoding. Consequently, no processing power needs to be put into performing a block matching algorithm for the blocks of pixels in the second area. For the blocks of pixels of the first area, selection between encoding each block of pixels can be done using a block matching algorithm, where the output determines if the block of pixels should be encoded using an I-block, P-block and P skip block. Any suitable block matching algorithm known in the art may be used, such as Exhaustive Search, Three Step Search, Two Dimensional Logarithmic Search, Four Step Search etc. Since computational resources have been freed up in the encoding of the second area, these resources may be used for encoding the first area, e.g. by increasing a motion vector search range of the encoder.

By the term "I-block" or "I-block encoding" should, in the context of present specification, be understood a block of pixels which is intra-coded.

By the term "P-block" or "P-block encoding" should, in the context of present specification, be understood a block of pixels which is predictive coded, i.e. holds only a motion vector and the differences (residual error) in the block of pixels from a corresponding block of pixels in the previous frame.

By the term "B-block" or "B-block encoding" should, in the context of present specification, be understood a block of pixels which is Bi-predictive coded, i.e. encoded using differences (residual error) between the block of pixels from a corresponding block of pixels in a preceding image frame and/or a following image frame along with a motion vector. In other words, a B-block may use only a preceding image frame, only a subsequent image frame, or both a preceding and a subsequent image frame for encoding the block.

By the term "skip block" or "skip encoding" should, in the context of present specification, be understood a block of pixels which is coded (using a previous frame, optionally also a following image frame) without sending residual error or motion vectors. The decoder will deduce the motion vector for such coded block from other blocks already decoded. Skip encoding may also be referred to as direct encoding.

By the term "block of pixels" should, in the context of present specification, be understood the basic units of pixels of the digital image used when encoding the digital image.

The block of pixels may in some video encoding standards be called a macroblock. In the video encoding standard H.264, the size of the block of pixels may be 16*16 pixels. In the video encoding standard H.265, the size of the block of pixels may vary between 16×16 to 64×64 pixels since H.265 employs the so called coding tree units (CTUs) instead of macroblocks. Other standards (codecs etc.) and sizes of the block of pixels may be used. With this embodiment, a more efficient encoding process may be achieved since the extent of a portion in the digital image representing the scene having the same degree of compression may approximately or perfectly overlap one or more block of pixels. It should be understood that all suitable block based codecs (i.e. a codec utilizing blocks), e.g., a H.264, H.265, MPEG-4 Part 2, or VP9 codec, may be used for this embodiment.

According to some embodiment, the encoder has a predefined first threshold for selecting to encode a block of pixels as an I-block based on an output from the block matching algorithm, wherein the method comprises the step of: during a movement of the camera, increasing the first threshold.

For a specific block of pixels in the first area, the block matching algorithm outputs a difference value or similar for the best match among the blocks in the first image which the block matching algorithm searched among. For example, the block matching algorithm may calculate a sum of absolute differences (SAD) for each comparison between block of pixels. Based on this difference value, the encoder chooses between encoding the specific block of pixels using an I-block, P-block and P skip block. The encoder has a predefined first threshold for selecting to encode a block of pixels as an I-block, e.g. corresponding to a SAD of 500. In this method, the threshold is increased such that the encoder will choose P or P-skip encoding for blocks of pixels which otherwise would have been encoded with an I-block encoding, e.g. by increasing the SAD threshold for encoding a block of pixels as an I-block to 600. Consequently, during movement of the camera (e.g. a PT movement), the first threshold is increased such that the encoder will select P-block encoding for some difference values that normally would result in an I-block encoding. Consequently, the bit rate for encoding the first area may be lowered since less blocks of pixels will be encoded as an expensive I-block, which in turn will lower the overall bit rate of the encoded second image.

According to some embodiment, the encoder has a predefined second threshold for selecting between encoding a block of pixels as a P skip block and encoding a block of pixels as a P block, based on an output from the block matching algorithm, wherein the method comprises the step of: during a movement of the camera, increasing the second threshold.

For example, the predefined second threshold for selecting between encoding a block of pixels as a P skip block and encoding a block of pixels as a P block may correspond to a difference value (e.g. SAD) of 50 outputted from the block matching algorithm for the best match. Below this value, the encoder will encode the block of pixels as a P skip block encoding (i.e. the residual and motion vector will not be encoded) while above 50 (but below the threshold for I-block encoding, e.g. SAD=600) the encoder will encode the block of pixels as a P-block encoding (the residual and motion vector will be encoded). By increasing the second threshold to e.g. SAID=100, more blocks of pixels in the first area of the second image frame will be encoded using P-skip block which may reduce the bit rate for the encoded first area of the second image frame.

According to some embodiments, the video stream further comprises a third image frame, the second image frame being previous to the third image frame, wherein the first area and second area comprises image data not present in the third image. This means that even if a subsequent image frame (third image frame) to the second image frame is considered by the encoder when encoding the second image frame (i.e. B-block encoding is possible), the method still is valid and advantageous.

According to some embodiments, the method further comprises the steps of: defining, based on the information regarding a movement of the camera, a third area of the second image frame comprising image data present also in the first image frame and in the third image frame, and a fourth area of the second image frame comprising image data present also in the third image frame and not present in the first image frame. This is done in a similar way as described above in conjunction with the defining of the second and first area.

For each specific block of pixels of the third area, the encoder can now select between encoding the specific block of pixels as one of: I-block, P-block, P skip block, B-block and B skip block based on an output from the block matching algorithm using the specific block of pixels and at least parts of the first and third image frames as input, and encoding the specific block of pixels according to the selection. This is because the encoder knows that the third area is covering an area of the surroundings that also is covered in the first image and the third area, which makes all of the above encoding methods viable for selection.

For the fourth area on the other hand, P-block or P-skip block is not a good alternative, since this area covers an area of the surroundings which is not covered in the first image. Consequently, the encoder is advantageously, for each specific block of pixels of the fourth area, selecting between encoding the specific block of pixels as one of: I-block, B-block and B skip block based on an output from the block matching algorithm using specific block of pixels and at least parts of the third image frame as input, and encoding the specific block of pixels according to the selection.

The present embodiment may increase the efficiency of the encoding operation since for different areas of the second image the selectable encoding methods are defined prior to encoding the blocks of pixels in the respective area. For example, for the fourth area, the encoder need not to search for matching blocks in the first image, thus reducing the computational complexity of the encoding process.

According to some embodiments, the encoder has a predefined third threshold for selecting between encoding a block of pixels as a B skip block and encoding a block of pixels as a B block, based on an output from the block matching algorithm, wherein the method comprises the step of: during a movement of the camera, increasing the third threshold.

Using the same argumentation as described above for the increasing the second threshold, the present embodiment may reduce the bit rate for the encoded third and fourth area of the second image frame.

According to some embodiments, the step of encoding blocks of pixels of the first area comprises using a first quantization parameter. Moreover, the step of encoding blocks of pixels of the second area comprises using a second quantization parameter. Moreover, the step of encoding blocks of pixels of the third area comprises using a third quantization parameter, Moreover, the step of encoding blocks of pixels of the fourth area comprises using a fourth quantization parameter. According to this embodiment, the third and fourth quantization parameters are lower than the first and second quantization parameter. It should be noted that the first and second quantization parameter may be equal or differ. It should also be noted that the third and fourth quantization parameter may be equal or differ.

Since the encoder knows, using the information regarding a movement of the camera, that the third and the fourth area comprises blocks of pixels which are likely to be part of the third image frame, while the first and second area comprises blocks of pixels which are likely to not be part of the third image frame, this knowledge may advantageously be used when determining a compression ratio of the blocks of pixels of the different areas. The relative quality or compression ration could be controlled by a quantization parameter (often called QP-value) which is adjustable on a block of pixel level. A lower quantization parameter leads to a less compressed block of pixels, or in other words, to a higher encoding quality. Spending a lot of bits when encoding a block of pixels that will disappear in the next frame is less worth than spending the bits on a block of pixels that will remain longer in the video stream. Consequently, this embodiment may increase the encoding quality and/or reduce the required bit rate.

According to some embodiments, the fourth quantization parameter is lower than the third quantization parameter. Since the fourth area comprises blocks of pixels which are likely to not be part of the first, preceding, image, while the blocks of pixels are likely to be a part of the third, subsequent, image, it is also likely that these blocks of pixels will remain in the video stream during more image frames compared to the block of pixels which are part of the third area. Consequently, by lowering the quantization parameter, and thus increase the encoding quality for blocks of pixels in the fourth area compared to blocks of pixels in the third area, this embodiment may increase the encoding quality and/or reduce the required bit rate.

According to some embodiments, the encoder is a H.264 encoder. In this case, the method further comprises the steps of: determining that the information regarding a movement of the camera corresponds to a horizontal movement of the camera, and rotating the second image prior to encoding the block of pixels of the second image. Since the slices defined in the H.264 encoder is defined as rows of pixels in an image, a horizontal movement would result in that a division of the image into first, second, third and fourth areas according to the above would be impossible to achieve. However, if the image is rotated prior to the encoding process, a slice or group of slices can very well correspond to the first, second, third and fourth areas.

According to embodiments, the method further comprises the step of: providing the information regarding a movement of the camera as an input to the block matching algorithm. This information may then advantageously be used by the block matching algorithm to define a starting point for the search of matching blocks between the image frames in the video stream or to select the best matching block between the image frames. An "accidental" best match, e.g. for matching blocks in a uniform (e.g. one colored) area between two image frames where the best match just happens to have a small SAD value, but where the motion vector for that block will deviate from the neighboring blocks, may worsen the search for matching blocks among the neighbors of the accidentally matched block. Using the information regarding a movement of the camera as an input may reduce these accidental matches, which in turn will make it possible to e.g. set the above described thresholds for P-skip encoding, B-skip encoding or I-block encoding to a higher SAD value.

In a second aspect, the present invention provides a computer program product comprising a computer-readable storage medium with instructions adapted to carry out the method according to the first aspect when executed by a device having processing capability.

In a third aspect, the present invention provides an encoder arranged for encoding a video stream captured by a camera, the video stream comprising a first image frame and a second image frame, the first image frame being previous to the second image frame in the video stream, the encoder comprising:
   a receiving component arranged to receive information regarding a movement of the camera,
   an area calculation component arranged to define, based on the information regarding a movement of the camera, a first area of the second image frame comprising image data present also in the first image frame, and a second area of the second image frame comprising image data not present in the first image frame,
   an encoding component arranged to:
      for the second area, encoding each block of pixels using I-block encoding, and
      for each specific block of pixels of the first area, selecting between encoding the specific block of pixels as one of: I-block, P-block and P skip block based on an output from a block matching algorithm using the specific block of pixels and at least parts of the first image frame as input, and encoding the specific block of pixels according to the selection.

In a third aspect, the present invention provides camera arranged to capture a video stream, the camera comprising a motion estimating device for estimating movements of the camera, the camera connected to an encoder as defined in claim 9, wherein the motion estimating device is arranged for transmitting data pertaining to the movements of the camera to the encoder, wherein the camera is arranged for transmitting the video stream to the encoder.

According to some embodiments, the motion estimating device is arranged to estimate movements of the camera using at least one of: input to a PT control of the camera, information on a step motor movement of the camera, motion data from a sensor in the camera and global motion estimation from temporal filtering of image frames in the video stream.

The second, third and fourth aspect may generally have the same features and advantages as the first aspect.

BRIEF DESCRIPTION OF THE DRAWINGS

The above, as well as additional objects, features and advantages of the present invention, will be better understood through the following illustrative and non-limiting detailed description of embodiments of the present invention, with reference to the appended drawings, where the same reference numerals will be used for similar elements, wherein.

DETAILED DESCRIPTION OF THE PREFERRED EMBODIMENTS

Figure 1:
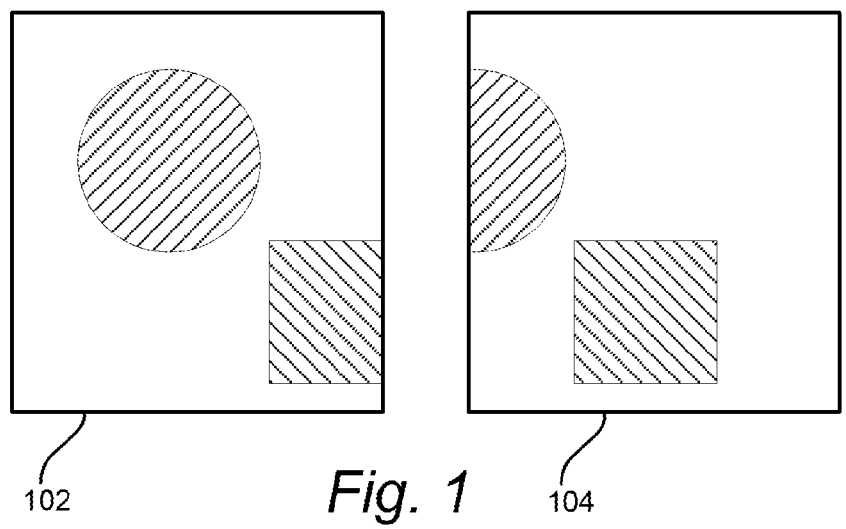
FIG. 1 shows a first and a second image frame of a video stream, wherein the camera capturing the video stream has moved between the first and the second image frame

FIG. 1 shows a first image frame 102 and a second image frame 104 from a video stream, where the first image frame 102 is previous to the second image frame 104 in the video stream. The two image frames 102, 104 each shows two objects, but since the camera moved between the first 102 and the second 104 image frame were captured, the two objects in the second image frame 104 are positioned farther to the left within the image compared to the two objects in the first image frame 102. The camera has thus panned to the right during the capture of the two image frames 102, 104, but with overlapping fields of view between the two image frames 102, 104.

Figure 2:
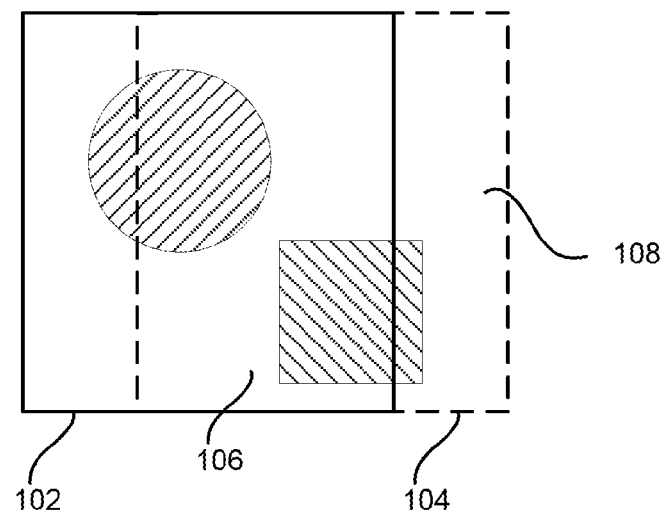
FIGS. 2-3 show a definition of a first and a second area in the second image of FIG. 1 based on the camera movement of FIG. 1 according to embodiments of the invention.

FIG. 2 shows the two image frames 102, 104 of FIG. 1, but overlapped to show an area 106 defining a field of view captured by both the first 102 and the second 104 image frames, and an area 108 defining a field of view only captured in the second image frame 104. In other words, FIG. 2 defines a first area 106 of the second image frame 104 that comprises image data present also in the first image frame 102, and a second area 108 of the second image frame 104 comprising image data not present in the first image frame 102.

Figure 3:
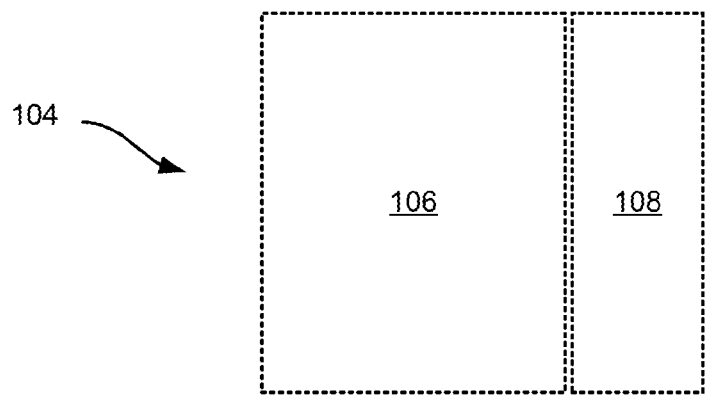

In FIG. 3, the two defined areas 106, 108 of the second image frame 104 are shown without the image content for illustration purposes. A method performed by an encoder for encoding the second image will now be described in conjunction with FIG. 8.

These two areas can be defined S804 in an encoder arranged to encode a video stream (e.g. comprising the first 102 and the second 104 image frames of FIGS. 1-2) captured by a camera, using information regarding a movement of the camera received S802 from the camera. In other words, no image analysis or similar is needed in the encoder for defining the areas 106, 108. Such information may be received from the camera and originate from a motion estimating device of the camera. The motion estimation device may use information such as input to a PT control of the camera, information on a step motor movement of the camera or motion data from a sensor in the camera to produce information regarding a movement of the camera. The motion estimation device may also use image analysis for extracting the information of a movement of the camera such as temporal filtering of image frames in the video stream to estimate a global motion of an image frame, i.e. a motion vector of the whole image frame.

Using the information regarding a movement of the camera, the encoder can thus define S804 a first area 106 of the second image frame 104 which comprises image data present also in the first image frame 102, and a second area 108 of the second image frame 104 comprising image data not present in the first image frame 102.

Since the second area 108 comprises image data, which at least to a large part, is not likely to be present in the first image frame (some of the data may of course be present in the first image frame due to movement of objects in the scene captured by the camera), the encoder may, without performing any costly block matching operations between the first 102 and the second 104 image frame, encode S814 each blocks of pixels using I-block encoding.

For the first area, regular encoding, i.e. selecting between encoding the specific block of pixels as one of: I-block, P-block and P skip block based on an output from a block matching algorithm using the specific block of pixels and at least parts of the first image frame as input to the block matching algorithm, and encoding S816 the specific block of pixels according to the selection, may be employed. The block matching algorithm outputs a value describing what block in the first image 102 that best matches the specific block in the second image frame 104, for example by outputting a motion vector describing the movement of the corresponding blocks between the first 102 and the second 104 image frames. In case no suitable matching block was found in the first image 102 for the specific block, the block matching algorithm may output a value describing this. The block matching algorithm also outputs some kind of value describing how good match the best match in the first image 102 was, for example a difference value (also known as cost function or cost value) which can be an SAD value, Mean Absolute Difference (MAD), Mean Squared Error (MSE) or any other suitable value known in the art of block matching algorithms. Based on this value, the encoder selects between the available encoding methods for encoding the specific block of pixels. For example, the encoder may have predefined thresholds for selecting between the available encoding methods, such that a difference value that meets e.g. the threshold for encoding the block of pixels as a P-skip block will be encoded in that way.

The saved processing power from the encoding of the second area may optionally be used for increasing the motion vector search range of the block matching algorithm. Moreover, the information regarding a movement of the camera may be provided as an input to the block matching algorithm, e.g. for defining a starting point for the search for matching blocks of pixels in the first image frame 102 for the specific block of pixels in the first area 106 of the second image frame 104.

Optionally, prior to encoding S816 the block of pixels in the first area 106 using either I-block encoding, P-block encoding or P skip block encoding, the thresholds of the encoder used for selecting between the available encoding methods may be altered. Since the encoder have defined a first 106 and a second area 108 as described above, and thus knows that the content of the first area 106 likely is present in the first image 102, this knowledge can advantageously be used to improve the encoding quality and/or reduce the bit rate during the movement of the camera. For example, the encoder may have a predefined first threshold for selecting to encode a block of pixels as an I-block based on an output from the block matching algorithm. In other words, based on e.g. the difference value outputted by the block matching algorithm for the best match in the first image 102 of a specific block of pixels of the second image 104, the encoder usually takes a certain decision when it comes to what encoding method to be used. For example, if the block matching algorithm outputs a SAD value, the predefined first threshold may be 400 for encoding the specific block of pixels as an I-block. In this embodiment, the knowledge of the movement of the camera can be used such that the first threshold can be increased S808 during the movement of the camera to e.g. 550.

Optionally, other thresholds may be altered during the movement of the camera. For example, the encoder may have a predefined second threshold for selecting between encoding a block of pixels as a P skip block and encoding a block of pixels as a P block, based on an output from the block matching algorithm. In other words, based on e.g. the difference value outputted by the block matching algorithm for the best match in the first image 102 of a specific block of pixels of the second image 104, the encoder usually takes a certain decision when it comes to what encoding method to be used. For example, if the block matching algorithm outputs a SAD value, the predefined second threshold may be 60 for encoding the specific block of pixels as a P-skip block. Below this value, the specific block of pixels is encoded as a P-skip block while above this value (but below the first threshold), the specific block of pixels is encoded as a P block. In this embodiment, the knowledge of the movement of the camera can be used such that the second threshold can be increased S810 during the movement of the camera to e.g. 105.

Figure 7:
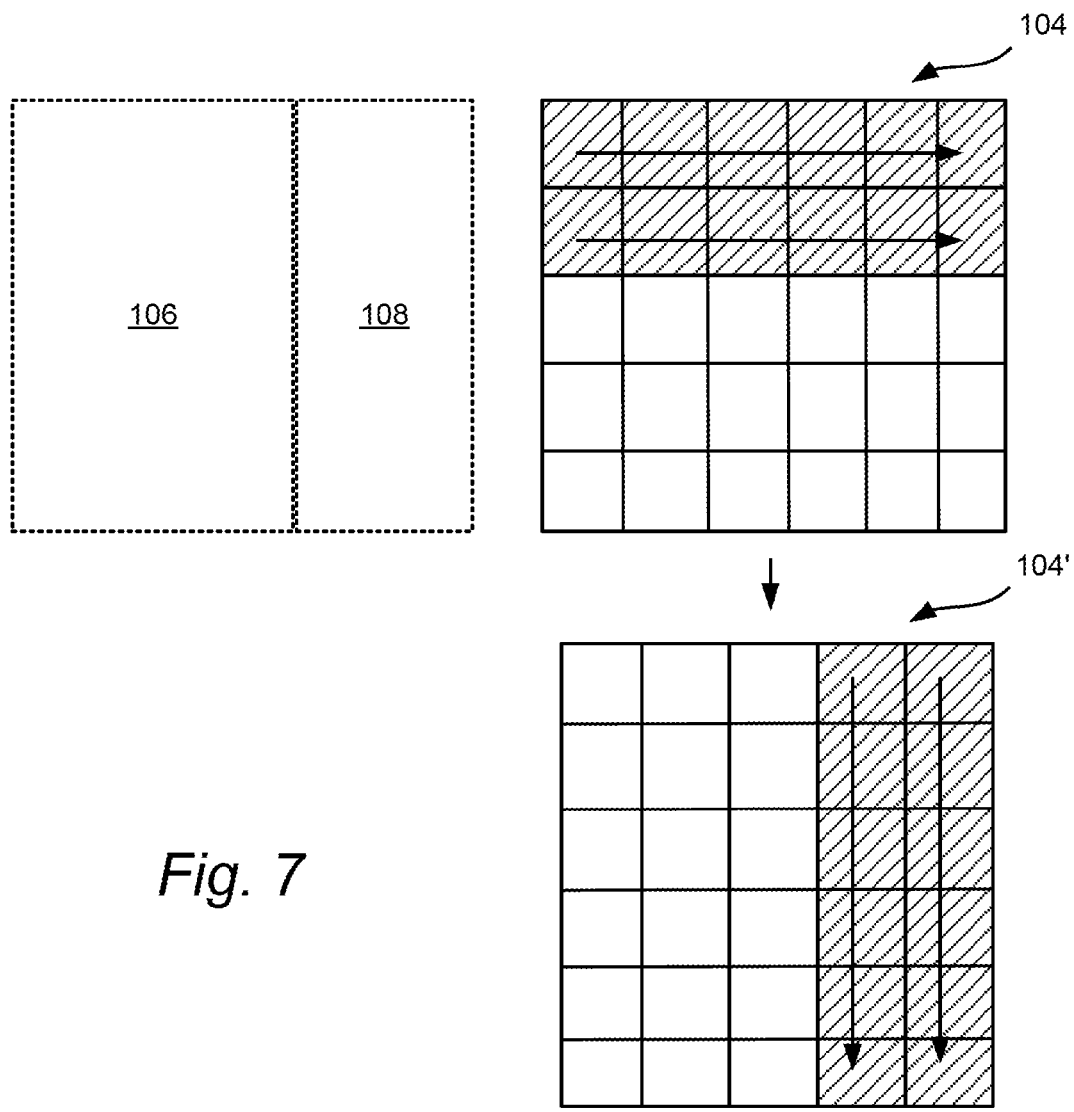
FIG. 7 shows a rotation of the second image prior to encoding the block of pixels of the second image according to embodiments of the invention.

There are different encoder standards for encoding video. Two examples are H.264/AVC and H.265. The concept of tiles of H.265 (Tiles divide the image frame into a grid of rectangular regions that can independently be decoded/encoded) makes the division of the image frames into regions as described possible for all sorts of movements of the camera (horizontal, vertical, diagonal etc.). However, for H.264 encoders, the concept of slices for dividing the image frame into regions which can be independently encoded is not equally flexible. A slice contains block of pixels which are processed in a scan order, normally left to right, beginning at the top of the image frame. This is described in FIG. 7, where a horizontal movement has resulted in a first 106 and second 108 area as shown in the Fig. Using the concept of slices, the image frame 104 cannot be divided into the regions/areas as shown in FIG. 7. However, by prior to dividing the image frame 104 into slices, the image frame is rotated 90 degrees to the left or right, to form a rotated image frame 104', the advantageous division of the image frame into a first area 106 and a second area 108 can be made.

Figure 4:
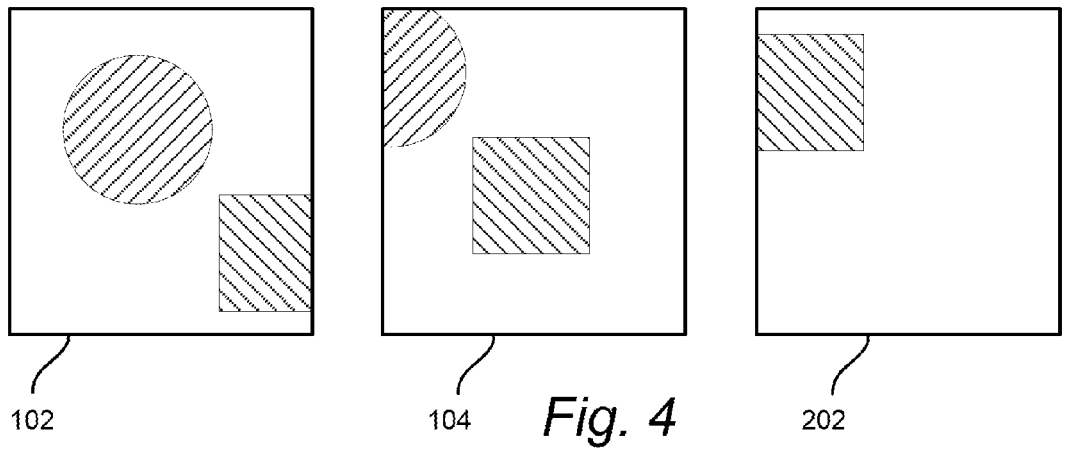
FIG. 4 shows a first, a second and a third image frame of a video stream, wherein the camera capturing the video stream has moved between the first and the second image frame and between the second and the third image frame.
Figure 5:
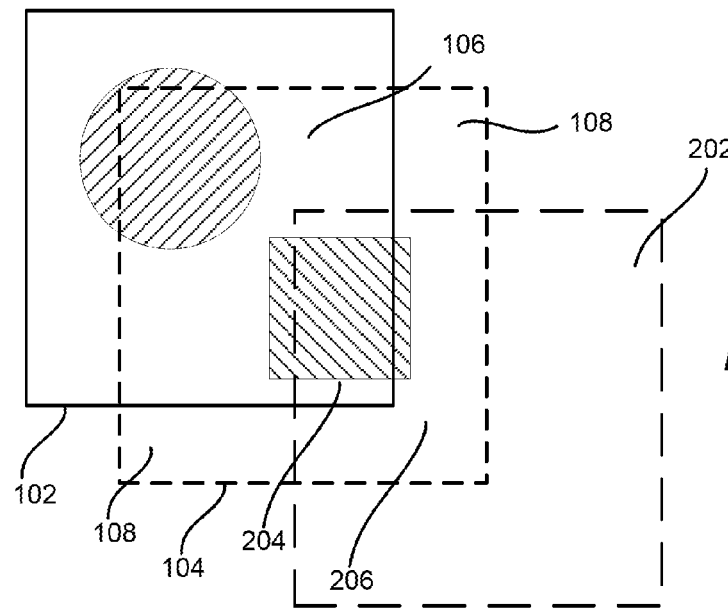
FIGS. 5-6 show a definition of a first, a second, a third and a fourth area in the second image of FIG. 4 based on the camera movement of FIG. 4 according to embodiments of the invention.
Figure 6:
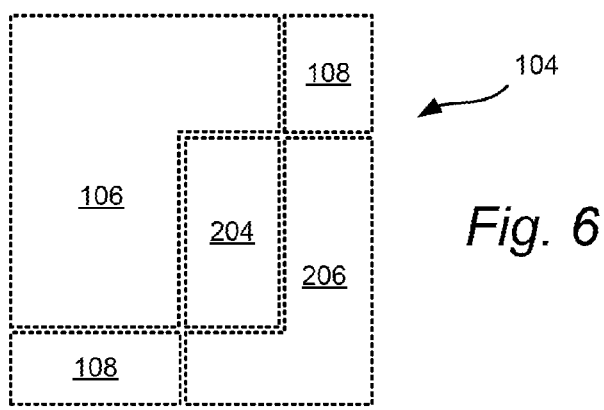

According to some embodiments, the encoding methods of the encoder comprises also B-block encoding and B-skip block encoding. In this way, also content of an image frame subsequent to the second image frame can be used for encoding purposes. This is shown in FIGS. 4-6. The video stream thus comprises a third image frame 202, the second image frame being previous to the third image frame. In this embodiment, the first area 106 and the second area 108 comprises image data not present in the third image. However, using the knowledge of the movement of the camera, and thus the knowledge of the FOV of the camera when capturing the third image frame 202, the second image frame 104 can now be divided into two further areas, a third area 204 and a fourth area 206.

FIG. 4 shows a first image frame 102, a second image frame 104 and a third image frame 202. The first image frame 102 is previous to the second image frame 104 in the video stream and the second image 104 frame is previous to the third image frame 202 in the video stream. The two image frames 102, 104 each shows two objects, but since the camera moved between the first 102 and the second 104 image frame were captured, the two objects in the second image frame 104 are positioned farther to the upper left within the image frame 104 compared to the two objects in the first image frame 102. In the third image frame 202 only one of the objects is shown, since the other object has left the FOV of the camera when capturing the third image frame 202. The camera has thus panned to the right and downwards during the capture of the three image frames 102, 104, 202, but still has overlapping fields of view between the three image frames 102, 104, 202.

FIG. 5 shows the three image frames 102, 104, 202 of FIG. 4, but overlapped to show an area 106 defining a field of view captured in both the first 102 and the second 104 image frames but not in the third image frame 202, as well as an area 108 defining a field of view only captured in the second image frame 104. Furthermore, a third area 204 of the second image frame depicts a field of view also captured by both the first 102 and the third 202 image frame. A fourth area 206 of the second image frame depicts a field of view also captured in the third image frame 202 but not in the first image frame 102.

In other words, FIG. 5 defines a first area 106 of the second image frame 104 that comprises image data present also in the first image frame 102 but not in the third image frame 202, a second area 108 of the second image frame 104 comprising image data not present in the first image frame 102 or in the third image frame 202, a third area 204 of the second image frame 104 comprising image data present also in the first image frame 102 and in the third image frame 202, and a fourth area 206 of the second image frame 104 comprising image data present also in the third image frame 202 and not present in the first image frame 102.

In FIG. 6, the four defined areas 106, 108, 204, 206 of the second image frame 104 are shown without the image content for illustration purposes.

A method performed by an encoder for encoding the second image as shown in FIG. 6 will now be described in conjunction with FIG. 8. The method of FIG. 8 can, when a third image frame 202 is included in the encoding process of the second image frame 104, be extended by further steps as will be described below. The steps of the method of FIG. 8 which are not described in this example (S804, S808, S810, S814 and S816) should be interpreted as described above in conjunction with FIGS. 1-3.

Using the information of the movement received S802 by the encoder; a third area 204 and a fourth area 206 of the second image frame 104 can be defined S806 as described above.

Since the encoder have defined the third 204 and a fourth 206 area as described above, and thus knows that the content of the third area 204 likely is present in both the first image frame 102 and the third image frame 202, while the content of the fourth area 206 likely is present in the third image 202 but not in the first image frame 102, this knowledge can advantageously be used to improve the encoding quality, reduce the computational complexity of the encoding and/or reduce the bit rate during the movement of the camera.

For example, using the above knowledge of the content of the third 204 and fourth 206 areas, the encoder can advantageously select encoding method among different sets of encoding methods for each of the two areas. For each specific block of pixels of the third area 204, the encoder may be selecting between encoding the specific block of pixels as one of: I-block, P-block, P skip block, B-block and B skip block based on an output from the block matching algorithm using the specific block of pixels and at least parts of the first 102 and third 202 image frames as input (since the third area likely comprise image data present in both the first 102 and the third 202 image frames), and encoding S818 the specific block of pixels according to the selection. On the other hand, for each specific block of pixels of the fourth area 206, the encoder may be selecting between encoding the specific block of pixels as one of: I-block, B-block and B skip block based on an output from the block matching algorithm using specific blocks of pixels and at least parts of the third image frame 202 (since it is likely that the image content of the fourth area 206 is present in the third image frame 202 but not in the first image frame 102) as input, and encoding S820 the specific blocks of pixels according to the selection. By knowing beforehand that e.g. the first image frame 102 likely does not comprise image data to be matched to a specific block of pixels in the fourth area 206, the computational complexity of the encoding method can be reduced for the fourth area.

Optionally, prior to encoding S818, S820, the block of pixels in the third and fourth areas, the thresholds of the encoder used for selecting between the available encoding methods may be altered.

For example, the encoder has a predefined third threshold for selecting between encoding a block of pixels as a B skip block and encoding a block of pixels as a B block, based on an output from the block matching algorithm. For example, if the block matching algorithm outputs an SAD value, the predefined third threshold may be 45 (for the best matching block of the third image frame 202 and/or the first image frame 102) for encoding the specific block of pixels as a B-skip block. Below this value, the specific block of pixels is encoded as a B-skip block while above this value (but below the first threshold), the specific block of pixels may encoded as a B block. In this embodiment, the knowledge of the movement of the camera can be used such that the third threshold can be increased S810 during the movement of the camera to e.g. 90.

As described above, the information regarding a movement of the camera as an input to the block matching algorithm such that the block matching algorithm may use this input as a starting value for where in the first and/or third image the block matching algorithm should start matching blocks and calculating difference values (cost functions etc.) for the blocks of pixels in the first 102 and/or third 202 image frame for a certain block of pixels in the second image frame 104.

Figure 8:
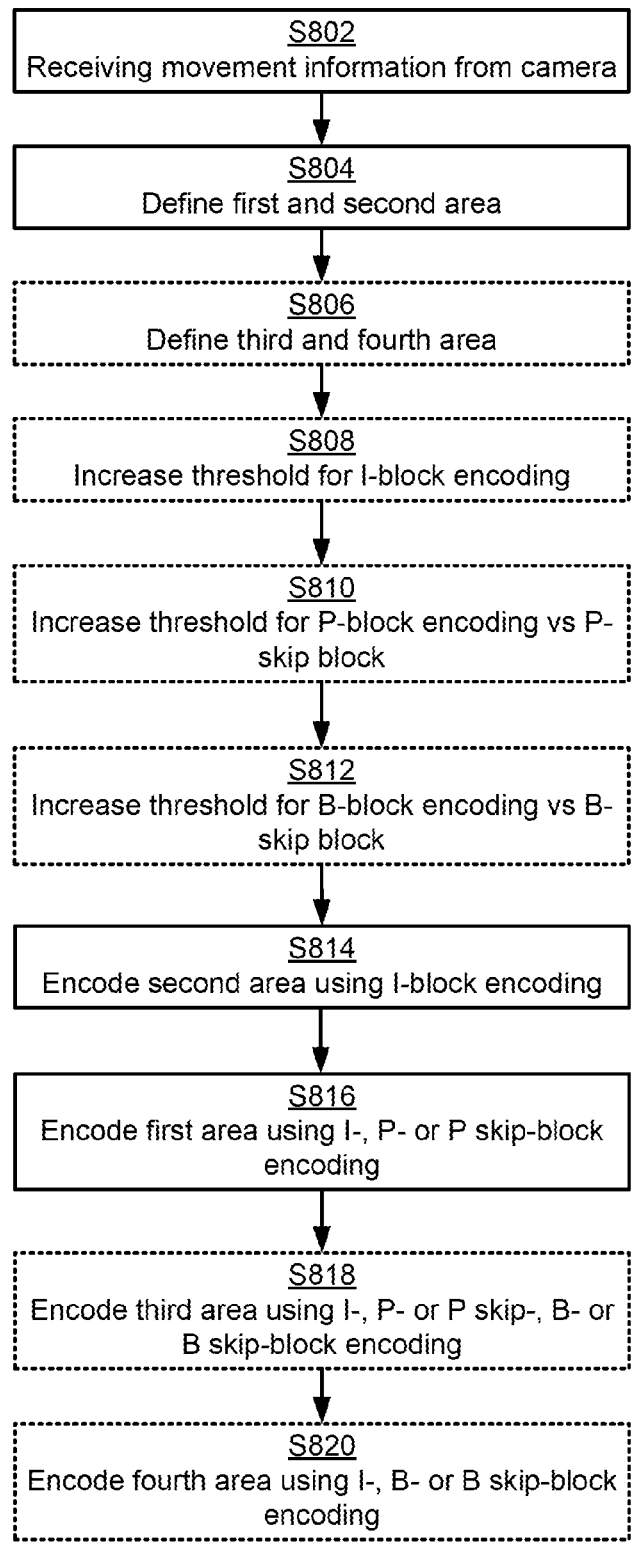
FIG. 8 shows a method performed in an encoder for encoding a video stream captured by a camera according to embodiments of the invention
Figure 9:
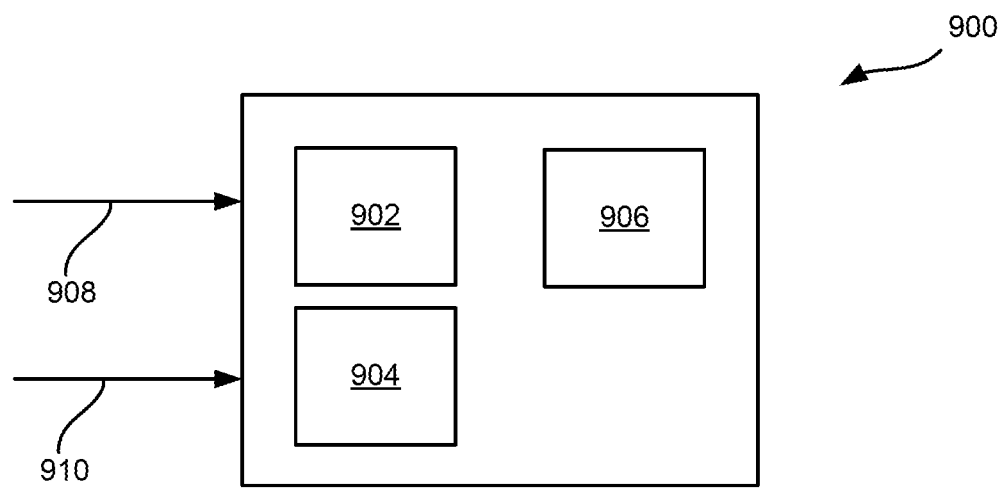
FIG. 9 shows an encoder according to embodiments of the invention.

FIG. 9 shows an encoder 900 implementing the method described in FIG. 8. The encoder 900 is thus arranged for encoding a video stream 908 captured by a camera. The video stream 908 comprises a first image frame and a second image frame and the first image frame is previous to the second image frame in the video stream 908. This video stream 908 is received by the encoder.

The encoder 900 further comprises a receiving component 902 arranged to receive information 910 regarding a movement of the camera. This receiving component may also be arranged to receive the video stream 908.

The encoder also comprises an area calculation component 904 which is arranged to define, based on the information 910 regarding a movement of the camera, a first area of the second image frame comprising image data present also in the first image frame, and a second area of the second image frame comprising image data not present in the first image frame.

The encoder further comprises an encoding component 906 arranged to: for the second area, encoding each block of pixels using I-block encoding, and for each specific block of pixels of the first area, selecting between encoding the specific block of pixels as one of: I-block, P-block and P skip block based on an output from a block matching algorithm using the specific block of pixels and at least parts of the first image frame as input, and encoding the specific block of pixels according to the selection.

The video stream 908 may according to some embodiments be received directly at the encoding component 906.

Figure 10:
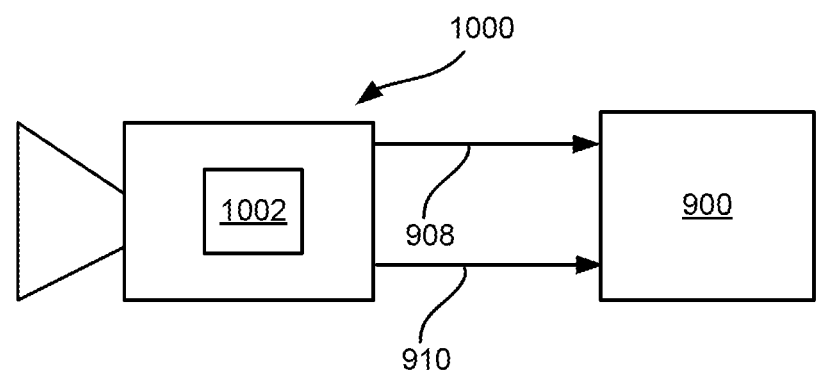
FIG. 10 shows a camera according to embodiments of the invention.

The encoder of the present disclosure may have a wired or wireless connection to the camera 1000 capturing the video stream 908 which is transmitted to the encoder 900. Such a camera 1000 is shown in FIG. 10. In some embodiments, the camera comprises the encoder 900. The camera comprises a motion estimating device 1002 for estimating movements of the camera, and transmitting information 910 regarding the movement to the encoder. The motion estimating device 1002 may be arranged to estimate the movements of the camera using at least one of: input to a PT control of the camera, information on a step motor movement of the camera, motion data from a sensor (e.g. a gyro, infrared sensor or similar motion sensors known in the art) in the camera and video camera software arranged to perform global motion estimation from temporal filtering of image frames in the video stream.

As described above, the knowledge of the movement of the camera may be used by the encoder for using different quantization parameters for different areas of the image frame to be encoded. Since the encoder may, at the time of the encoding of e.g. the second image frame, have access to data for how the camera moved during the next frame (e.g. the third image frame) available at the time of the encoding of the current second image frame, this may be used for increasing the encoding quality and/or reduce the required bit rate. Except for what is already described above, a further example will be given.

For a video with the 8 block of pixels A, B, C, D, E, F, G and H (e.g. 16×16 pixels) defined as:

| A | B | C | D |
| E | F | G | H | with a PTZ motion of 16 pixels to the right:
Blocks A & E will disappear in the next frame.
Blocks B & F will disappear in the second next frame.
Blocks D & H are new in this frame.
The rest of the blocks (C & G) will stay in the video at least two more frames.
Based on the above information regarding the panning movement of the camera, the following QP table can be applied:

| +2 | +1 | 0 | −1 |
| +2 | +1 | 0 | −1 |

It should be noted that a lower QP-value lowers the compression and thus increases the encoding quality.

The systems (e.g. encoder 900) and methods disclosed hereinabove may be implemented as software, firmware, hardware or a combination thereof. In a hardware implementation, the division of tasks between functional units or components referred to in the above description (e.g. a receiving component 902, area calculation component 904, etc.) does not necessarily correspond to the division into physical units; to the contrary, one physical component may have multiple functionalities, and one task may be carried out by several physical components in cooperation. Certain components or all components may be implemented as software executed by a digital signal processor or microprocessor, or be implemented as hardware or as an application-specific integrated circuit. Such software may be distributed on computer readable media, which may comprise computer storage media (or non-transitory media) and communication media (or transitory media). As is well known to a person skilled in the art, the term computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by a computer.

What is claimed is:

1. A method performed in an encoder for encoding a video stream captured by a camera, the video stream depicting a scene, the video stream comprising a first image frame and a second image frame, the first image frame being previous to the second image frame in the video stream, the first and second image frames covering partly overlapping parts of the scene, the method comprising the steps of:
   receiving information regarding a movement of the camera,
   defining, based on the information regarding a movement of the camera, a first area and a second area of the second image frame, wherein the first area covers a part of the scene also covered by the first image frame, and where the second area covers a part of the scene not covered by the first image frame,
   for the second area, encoding each block of pixels using I-block encoding,
   for each specific block of pixels of the first area, selecting between encoding the specific block of pixels as one of: I-block, P-block and P skip block based on an output from a block matching algorithm using the specific block of pixels and at least parts of the first image frame as input to the block matching algorithm, and encoding the specific block of pixels according to the selection.

2. The method according to claim 1, wherein the encoder has a predefined first threshold, wherein the encoder is arranged for selecting to encode a block of pixels as an I-block when an output from the block matching algorithm exceeds the predefined threshold, and wherein the method comprises the step of:
   during a movement of the camera, increasing the first threshold.

3. The method according to claim 1, wherein the encoder has a predefined second threshold, wherein the encoder is arranged for selecting between encoding a block of pixels as a P skip block and encoding a block of pixels as a P block, wherein the encoder is arranged to encode the block of pixels as a P skip block when an output from the block matching algorithm does not exceed the second predefined threshold, and wherein the method comprises the step of:
   during a movement of the camera, increasing the second threshold.

4. The method according to claim 1, wherein the video stream further comprises a third image frame, the second image frame being previous to the third image frame in the video stream, wherein the third image frame covers a part of the scene partly overlapping the parts of the scene covered by the first and the second image frame, wherein the first area and second area cover a part of the scene not being covered by the third image frame.

5. The method according to claim 4, further comprising the steps of:
   defining, based on the information regarding a movement of the camera, a third area of the second image frame covering a part of the scene also covered by the first image frame and the third image frame, and a fourth area of the second image frame covering a part of the scene also covered by the third image frame and not covered by the first image frame,
   for each specific block of pixels of the third area, selecting between encoding the specific block of pixels as one of: I-block, P-block, P skip block, B-block and B skip block based on an output from the block matching algorithm using the specific block of pixels and at least parts of the first and third image frames as input, and encoding the specific block of pixels according to the selection,
   for each specific block of pixels of the fourth area, selecting between encoding the specific block of pixels as one of: I-block, B-block and B skip block based on an output from the block matching algorithm using the specific block of pixels and at least parts of the third image frame as input, and encoding the specific block of pixels according to the selection.

6. The method according to claim 5, wherein the encoder has a predefined third threshold for selecting between encoding a block of pixels as a B skip block and encoding a block of pixels as a B block, wherein the encoder is arranged to encode the block of pixels as a B skip block when an output from the block matching algorithm does not exceed the third predefined threshold, wherein the method comprises the step of:
   during a movement of the camera, increasing the third threshold.

7. The method according to claim 6,
   wherein the step of encoding blocks of pixels of the first area comprises using a first quantization parameter,
   wherein the step of encoding blocks of pixels of the second area comprises using a second quantization parameter,
   wherein the step of encoding blocks of pixels of the third area comprises using a third quantization parameter,
   wherein the step of encoding blocks of pixels of the fourth area comprises using a fourth quantization parameter,
   wherein the third and fourth quantization parameters are lower than the first and second quantization parameter.

8. The method according to claim 7, wherein the fourth quantization parameter is lower than the third quantization parameter.

9. The method according to claim 1, wherein the encoder is an H.264 encoder, wherein the method further comprises the steps of:
   determining that the information regarding a movement of the camera corresponds to a horizontal movement of the camera,
   rotating the second image prior to encoding the block of pixels of the second image.

10. The method according to claim 1, further comprising the steps of:
    providing the information regarding a movement of the camera as an input to the block matching algorithm.

11. A computer program product comprising a computer-readable storage medium with instructions adapted to carry out the method of claim 1 when executed by a device having processing capability.

12. An encoder arranged for encoding a video stream captured by a camera, the video stream depicting a scene, the video stream comprising a first image frame and a second image frame, the first image frame being previous to the second image frame in the video stream, the first and second image frame covering partly overlapping parts of the scene, the encoder comprising:
- a receiving component arranged to receive information regarding a movement of the camera,
- an area calculation component arranged to define, based on the information regarding a movement of the camera, a first area and a second area of the second image frame, wherein the first area covers a part of the scene also covered by the first image frame, and where the second area covers to a part of the scene not covered by the first image frame,
- an encoding component arranged to:
  - for the second area, encoding each block of pixels using I-block encoding, and
  - for each specific block of pixels of the first area, selecting between encoding the specific block of pixels as one of: I-block, P-block and P skip block based on an output from a block matching algorithm using the specific block of pixels and at least parts of the first image frame as input, and encoding the specific block of pixels according to the selection.

13. A camera arranged to capture a video stream depicting a scene, the camera comprising a motion estimating device for estimating movements of the camera, the camera connected to an encoder as defined in claim 12, wherein the device is arranged for transmitting information pertaining to the movements of the camera to the encoder, and wherein the camera is arranged for transmitting the video stream to the encoder.

14. A camera according to claim 13, wherein the motion estimating device is arranged for estimating movements of the camera using at least one of: input to a PT control of the camera, information on a step motor movement of the camera, motion data from a sensor in the camera and global motion estimation from temporal filtering of image frames in the video stream.

* * * * *